United States Patent [19]

Furuishi et al.

[11] Patent Number: 4,811,563
[45] Date of Patent: Mar. 14, 1989

[54] VIBRATION-REDUCING APPARATUS

[75] Inventors: Yoshiro Furuishi; Takuya Suganami; Michio Fujiwara, all of Amagasaki, Japan

[73] Assignee: Mitsubishi Denki Kabushiki Kaisha, Tokyo, Japan

[21] Appl. No.: 177,396

[22] Filed: Apr. 4, 1988

[30] Foreign Application Priority Data

Apr. 20, 1987 [JP] Japan .................................. 62-98411

[51] Int. Cl.$^4$ ................................................ F02G 1/04
[52] U.S. Cl. ......................................... 60/517; 60/520
[58] Field of Search .................................. 60/517, 520

[56] References Cited

U.S. PATENT DOCUMENTS

| 4,400,941 | 8/1983 | Rauch ................................. 60/520 |
| 4,694,650 | 9/1987 | Vincent .............................. 60/520 |
| 4,742,679 | 5/1988 | Inoda et al. ...................... 60/520 X |

Primary Examiner—Allen M. Ostrager
Attorney, Agent, or Firm—Oblon, Fisher, Spivak, McClelland & Maier

[57] ABSTRACT

In a vibration-reducing apparatus for a direct-acting type stirling engine, a change of pressure caused by the reciprocal movement of a displacer is applied to a power piston to produce a mechanical force, and the mechanical force is converted into an electric power by a direct-acting type electric generator which is directly connected to the power piston so as to effect reciprocating movements with the power piston. Such apparatus comprises a vibration-controlling actuator fixed to a cylinder to produce a vibration-controlling force in response to a drive-controlling signal given by the outside thereof, a detector for detecting an unbalanced movement by a force of inertia in the reciprocating movements of a direct-driving part consisting of the power piston and the direct-acting type electric generator, and a control circuit for receiving a detection signal from the detector to control the vibration-controlling actuator so that the vibration-controlling force of the vibration-controlling actuator cancels the unbalanced movement by the force of inertia caused by the reciprocating movements of the direct driving part.

5 Claims, 8 Drawing Sheets

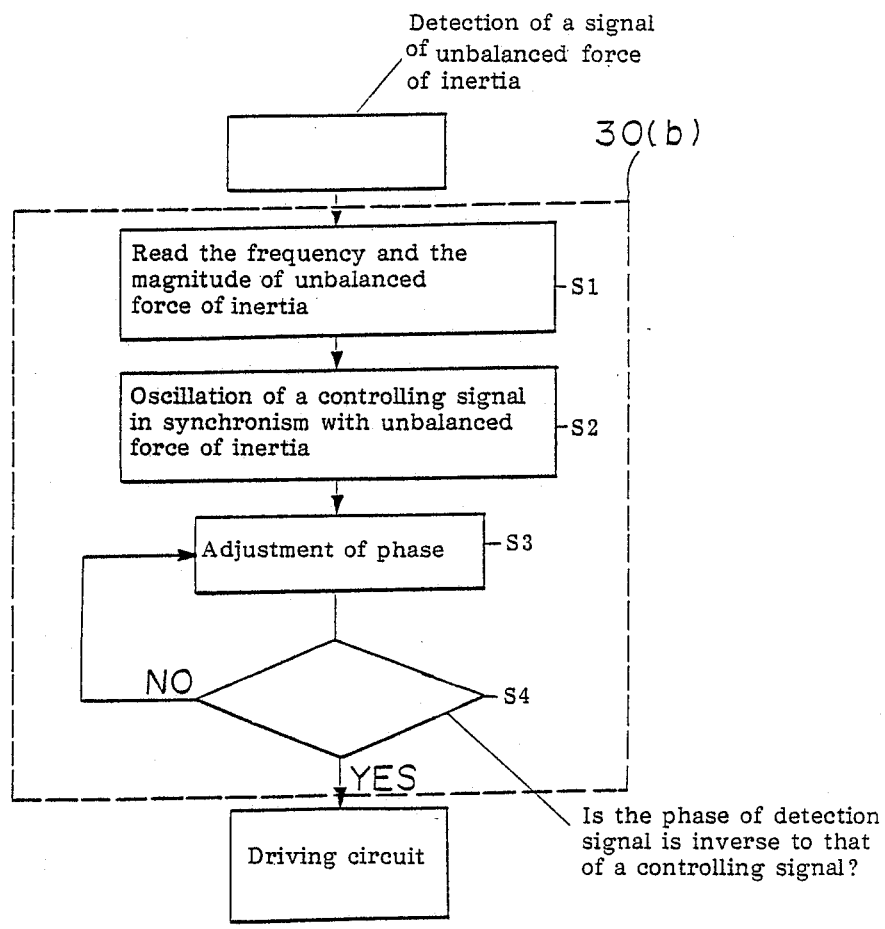

VIBRATION-REDUCING APPARATUS

BACKGROUND OF THE INVENTION

1. Field of the Invention

The present invention relate to a stirling engine. More particularly, it relates to a vibration-reducing apparatus capable of reducing vibrations and deadening noises caused in the operation of the stirling engine by using an additional weight.

2. Discussion of Background

FIG. 7 is a longitudinal cross-sectional view showing the structure of a typical power transmitting unit in a conventional stirling engine with a crank mechanism. In FIG. 7, a reference numeral 1 designates a crank casing in which an assembly of the power transmitting unit for the stirling engine is enclosed. A numeral 2 designates a first flange fixed to the crank casing 1 by means of fastening elements such as bolts which are engaged with holes formed in the crank casing 1, a numeral 3 designates a bearing housing connected to the crank casing 1 in the same manner as the flange 2, a numeral 4 designates a second flange connected to the crank casing 1 through the bearing flange 3 by means of fastening elements, a numeral 5 designates a first bearing held by the bearing housing 3, a numeral 6 designates a second bearing held by the first flange 2 and a numeral 7 designates a crank shaft supported by the first and second bearings 5, 6 in a freely rotatable manner, the crank shaft 7 transmitting a power produced in the stirling engine to an outer device. A mechanical seal 8 is mounted on the crank shaft 7 to prevent gas enclosed in the crank casing 1 from escaping. A pair of balance weights 9 and 10 are respectively fixed to the crank shaft 7 so as to balance the crank shaft 7 of the stirling engine when it is rotated.

A numeral 14 designates a lubricating oil received in the bottom of the crank casing 1, which is to lubricate each moving part of the stirling engine, and a numeral 15 designates a splasher for splashing the lubricating oil, the splasher being attached to a connecting rod 13 for a displacer or connecting rods 11, 12 for a power piston, which are connected to the crank shaft 7 by means of a bearing. A crosshead 21 is connected to the connecting rods 11, 12. The crosshead 21 is also connected to a power piston 18 and a rod 22 for the power piston. The outer circumferential surface of the crosshead 21 is in contact with the inner surface of the cylinder 20 as a bearing so as to be in a reciprocatedly slidable manner.

The connecting rod 13 for displacer is connected to the crank shaft 7 by means of a bearing in a freely rotatable manner. A piston rod 17 for displacer is connected to the connecting rod 13 by means of a piston pin 16. The piston rod 17 is passed through each central through hole of the crosshead 21, the power piston rod 22 and the power piston 18 and is connected to a displacer piston 19.

The cylinder 20 is mounted on the upper part of the crank casing 1 so that it receives the displacer piston 19 and the power piston 18 to allow their reciprocate-sliding movements.

In FIG. 7, the structure of the combustion unit and the heat exchanging unit of the stirling engine is omitted from the figure.

The operation of the conventional stirling engine will be described.

In the so called one-cylinder-two piston serially arranged crank shaft type stirling engine, change in pressure produced in the cylinder 20 causes the power piston to produce a force, which is transmitted to the connecting rods 11, 12 by the power piston rod 22 and the crosshead 21, whereby the work of rotation is taken at the outside through the crank shaft 7.

A part of the rotational work is transmitted to the displacer piston 19 to induce a reciprocating movement so as to function as a stirling engine.

FIG. 6 is a schematic view showing the construction of a typical direct-acting type stirling engine. The direct-acting type stirling engine is different from the crank shaft type stirling engine as shown in FIG. 7, and it allows to take out a power obtained by the reciprocating movements of the displacer piston 19 without using the crank mechanism. In FIG. 6, the same reference numerals as in FIG. 7 designate the same or corresponding parts. The cylinder 20 contains the displacer piston 19 and the power piston 18 in the same manner as the crank shaft type stirling engine. A driving shaft 26 is directly connected to the power piston 18. A numeral 23 designates a direct-acting type electric generator which is adapted to convert a mechanical power produced by the power piston 18 into an electric power. In the electric generator 23, there are a plurality of permanent magnets arranged in a cylinderical form, each being to be magnetized in the radial direction, a yoke 23b supporting the permanent magnets 23a to form a magnetic circuit, the yoke being movable with the power piston 18, a direct-acting driving part 23 contisting of mechanical springs which assures to form a balancing point of movement for a movable part contisting of the power piston 18, the driving shaft 26, the permanent magnets 23a and the yoke 23b, and a coil 23d inserted in a magnetic air gap formed between the permanent magnets 23a and the yoke 23d, the coil being fixed to a casing 27 which is, in turn, connected to the cylinder 20.

In the conventional direct-acting type stirling engine having the above-mentioned construction, change in pressure produced in the cylinder 20 acts on the power piston 18 to thereby cause reciprocating movements of the yoke 23b with the permanent magnets 23a through the driving shaft 26. In this case, a magnetic flux formed by the permanent magnets 23a alternately crosses the coil 23d, whereby an electric power is induced in the coil 23d by electromagnetic function. The electric power is taken outside as a result of the function of the stirling engine.

In the conventional direct-acting type stirling engine having the construction as described above, a force of inertia caused by the reciprocating movements of the direct-acting driving part contisting of the power piston 18, the permenent magnets 23a and the yoke 23b is very large. The force of inertia caused by the reciprocating movements is transmitted to the casing 27 by means of the springs 23c. The cylinder 20 is supported by a frame 25 through a elastic mount 24 so as not to transmit vibrations to the frame 25. However, the force of inertia from the direct-acting driving part is great, and a transmitting force to the frame 25 is also large. As a result, vibrations in the engine become large.

SUMMARY OF THE INVENTION

It is an object of the present invention to provide a vibration-reducing apparatus for a direct-acting type stirling engine which capable of reducing a force of inertia caused by reciprocating movements of the direct-acting driving part and of reducing vibrations in the engine as well as deadening noises in the operation of the engine.

The foregoing and the other objects of the present invention have been attained by providing a vibration-reducing apparatus for a direct-acting type stirling engine wherein a change of pressure caused by reciprocating movements of a displacer is applied to a power piston to produce a mechanical force, and the mechanical force is converted into an electric power by a direct-acting type electric generator which is directly connected to the power piston so as to effect reciprocating movements with the power piston, which comprises:

a vibration-controlling actuator fixed to a cylinder to produce a vibration-controlling force in response to a drive-controlling signal given by the outside thereof;

a detector for detecting an unbalanced movement by a force of inertia in the reciprocating movements of a direct-driving part consisting of the power piston and the direct-acting type electric generator; and, a control circuit for receiving a detection signal from the detector to control the vibration controlling actuator so that the vibration controlling force of the vibration-controlling actuator cancels the unbalanced movement by the force of inertia caused by the reciprocating movements of the direct driving part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a flow chart showing controlling operations by the control circuit.

DETAILED DESCRIPTION OF THE PREFERRED EMBODIMENTS

In the following, preferred embodiments of the vibration-reducing apparatus according to the present invention will be described with reference to the drawings.

Figure 1:
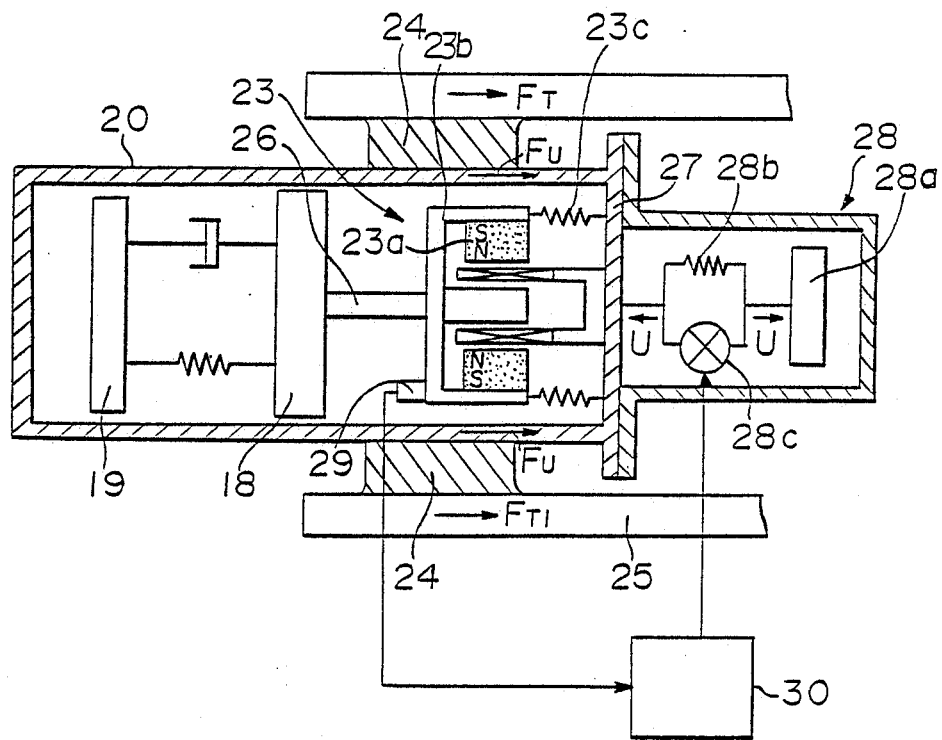
FIG. 1 is a longitudinal cross-sectional view of the structure of an embodiment of the vibration-reducing apparatus for a direct-acting type stirling engine according to the present invention.

FIG. 1 is a longitudinal cross-sectional view of an embodiment of the vibration-reducing apparatus for a direct-acting type stirling engine, wherein the same reference numerals disignate the same or corresponding parts. A reference numeral 28 designates a vibration-controlling actuator fixed to the casing 27 of the cylinder 20. The vibration-controlling actuator 28 is to produce a vibration-controlling force in response to a drive-controlling signal given by an outer device of the actuator 28. A vibration sensor 29 is directly mounted on the yoke 23b so as to detect the acceleration of vibration produced in the direct-acting driving part. As the vibration sensor 29, a piezo-electric type, a strain guage type or a servo type vibration sensor is usable. An electric circuit including a control circuit 30 is connected between the vibration sensor 29 and the vibration-controlling actuator 28. The control circuit 30 receives a detection signal from the vibration sensor 29 and controls a driving force of the vibration-controlling actuator 28 so that the vibration controlling force of the vibration controlling actuator 28 cancels an unbalanced movement by a force of inertia when the direct-acting driving part is driven. An additional weight 28a is held in the actuator 28 so as to be freely movable by a supporting spring 28a. There is also provided in the actuator 28 a driving source 28c for driving the additional weight 28, the power source 28c being a vibration-controlling force generating part.

Figure 2:
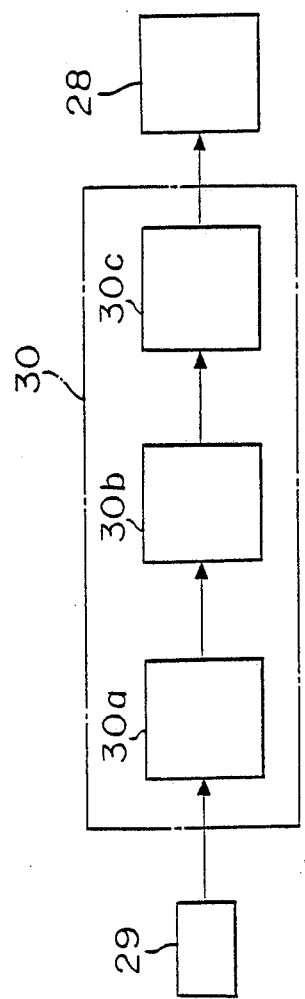
FIG. 2 is a block diagram showing an embodiment of the control circuit used for the vibration-reducing apparatus of the present invention.

FIG. 2 is a block diagram showing an embodiment of the control circuit 30 in detail. In FIG. 2, a reference numeral 30a designates a preamplifier for amplifying a voltage signal from the vibration sensor 29 to a predetermined voltage level, a numeral 30b designates a control circuit including a predetermined rule of control for driving and controlling the vibration-controlling actuator 28, and a numeral 30c designates a driving cicuit which is controlled by a control signal from the control circuit 30b and supplies a power to drive the vibration-controlling actuator 28. The preamplifier 30a, the control circuit 30b and the driving circuit 30c are all constituted by electronic circuits.

Figure 3:
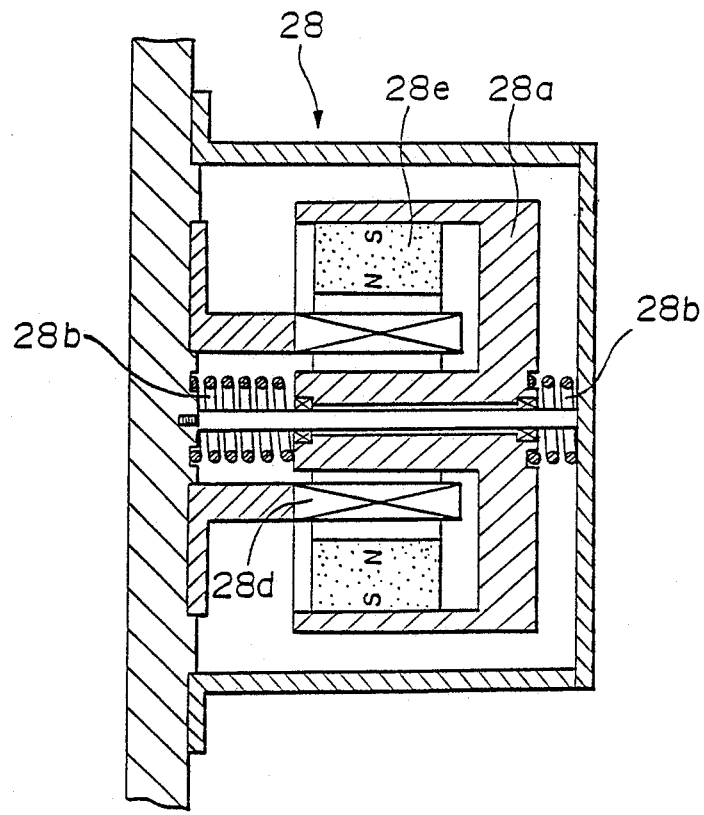
FIG. 3 is a longitudinal cross-sectional view of an embodiment of the vibration-controlling actuator.

FIG. 3 is a longitudinal cross-sectional view of an embodiment of a current-feeding type linear actuator used for the vibration-controlling actuator 28 shown in FIG. 1. In FIG. 3, a numeral 28a designates a yoke holding permanent magnets 28e which form a magnetic circuit and functions as a movable weight. A numeral 28b designates supporting springs for supporting the moveble weight, and a numeral 28d designates an exciting coil. By feeding a driving current to the exciting coil 28d from the driving circuit 30c, an electromagnetic force is generated, which acts on the cylinder 20 as a vibration-controlling force.

The operation of the vibration-reducing apparatus of the above-mentioned embodiment of the present invention will be described.

When a driving force is generated, an acceleration speed of vibration produced in the direct-acting driving part comprising the power piston 18, the yoke 23b and so on, is detected by the vibration sensor 29. Since a force of inertia in the reciprocating movements of the direct-acting driving part is determined by the acceleration speed of vibration, the magnitude of the force of inertia in the reciprocating movements and the frequency of the movements can be obtained by a vibration acceleration signal detected. Then, the acceleration signal from the vibration sensor 29 is inputted in the preamplifier 30a of the control circuit 30 to amplify the signal to a predetermined level of voltage signal. The amplified signal is inputted in the control circuit 30b. The control circuit 30b stores therein a predetermined rule of control such that the phase of the vibration-controlling force produced by the vibration-controlling actuator 28 is made an inverse relation to the phase of the force of inertia, which produces an unbalanced force, in the direct-acting driving part so as to cancel the unbalanced movement caused by the force of inertia.

In the following, an example of the rule of control possessed by the control circuit 30b and the function of it will be described.

An unbalanced force of inertia Fu produced by the direct-acting driving part, i.e. the power piston 18 as a main component is expressed by:

$$F_u = M_p \cdot S \cdot \omega^2 \quad (1)$$

where $M_p$ is the mass of the power piston, S is stroke of the power piston and $\omega$ is angular frequency of the power piston.

In the conventional power transmitting unit, the unbalanced force of inertia Fu is directly transferred to the frame 25. When the transmitting force is $F_T$, $$F_T = F_u \quad (2).$$

In the present invention, the vibration-controlling actuator 28 is provided to reduce the transmitting force $F_T$. When the vibration-controlling force procduced by the actuator 28 is U, it is expressed by:

$$U = k_f \cdot i \, (\omega c) \quad (3)$$

where kf is a constant of force for the actuator 28, i is a driving electric current and $\omega$ is frequency of driving electirc current. The stroke S of the power piston and the angular frequency $\omega$ as in the formula (1) are detected by a detector for detecting unbalanced force of inertia of the direct-acting driving part (Step 1 in FIG. 8). Then, the intensity driving current i and the frequency $\omega c$ of it is controlled for the actuator 28 on the basis of an amount of the detected signal (S2 in FIG. 8). Further, the phase of the driving current i is compensated so that the phase of the unbalanced force of inertia is in inverse relation to that of the vibration-controlling force U (S3 and S4 in FIG. 8). A transmitting force $F_T$ transmitted to the frame 25 by the above-mentioned control system is expressed by:

$$F_T = F_u - U \quad (4)$$

Thus, the unbalanced force of inertia Fu is cancelled by the vibration-controlling force U from the actuator 28, and the transmitting force $F_T$ to the frame 25 is greatly reduced, whereby vibration in the engine can be reduced and calm operations of the engine can be obtained.

The output signal of the control circuit 30b is inputted to the driving circuit 30c, which supplies a driving current to the exciting coil 28d of the vibration-controlling actuator 28 in response to the output signal. As a result, an electromagnetic force is produced in the exciting coil 28d due to an interacting function of a magnetic flux produced by the permanent magnets 28e and the exciting coil 28d. The electromagnetic force produces a vibration-controlling force to cancel the unbalanced force of inertia in the direct-acting driving part. Namely, a part of the vibration-controlling force acts on the casing 27 to reduce the vibrations of the casing 27, and the other part, i.e. a rective force of the vibration-controlling force takes balance to the force of inertia of the additional weight 28a (FIG. 1). The additional weight 28a forms a reactive dynamic point.

In the above-mentioned embodiment, the unbalanced force of inertia by the reciprocting movements of the direct-acting driving part in the diret-acting type stirling engine can be positively reduced by using a feedback servo mechanism to thereby minimize the vibrations caused by the engine.

Figure 4:
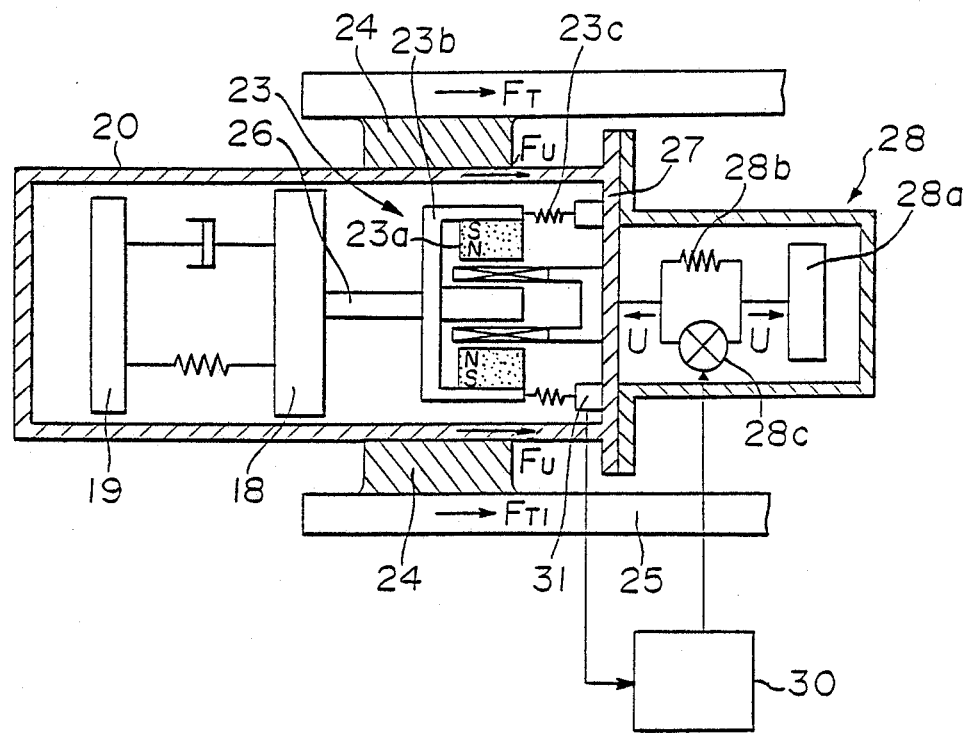
FIG. 4 is a longitudinal cross-sectional view of another embodiment of the vibration-reducing apparatus for a direct-acting type stirling engine of the present invention.

In the above-mentioned embodiment, description has been made as to the case that the unbalanced force of inertia in the direct-acting driving part is detected by the vibration sensor. However, the same effect can be obtained, instead of using the vibration sensor, by providing a load-weight converting device 31 between the mechanical spring 23c and the casing 27 as shown in FIG. 4, whereby the unbalanced force of inertia of the direct-acting driving part can be directly detected. As such device 31, a strain guage type or a piezo-electric type load-weight converting device is usable.

Figure 5:
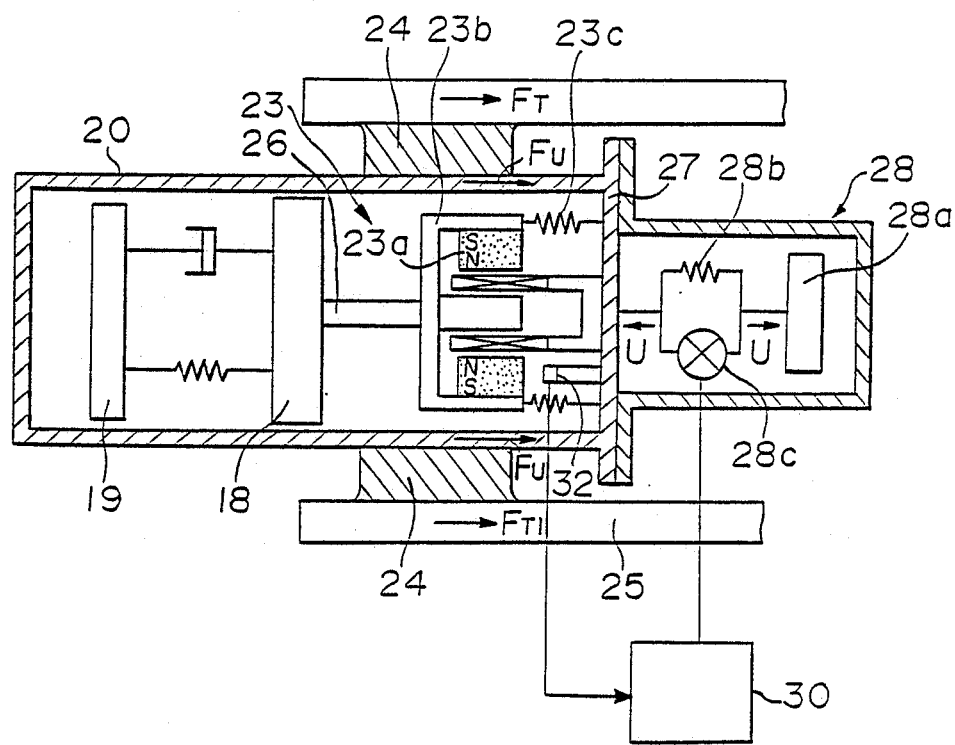
FIG. 5 is a longitudinal cross-sectional view of still another embodiment of the vibration-reducing apparatus of the present invention.
Figure 6:
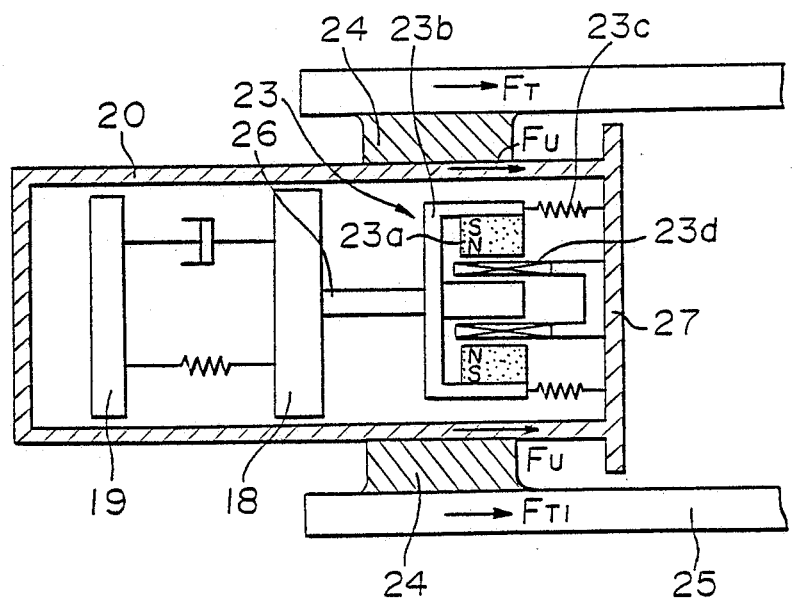
FIG. 6 is a longitudinal cross-sectional view of the structure of a conventional direct-acting type stirling engine.
Figure 7:
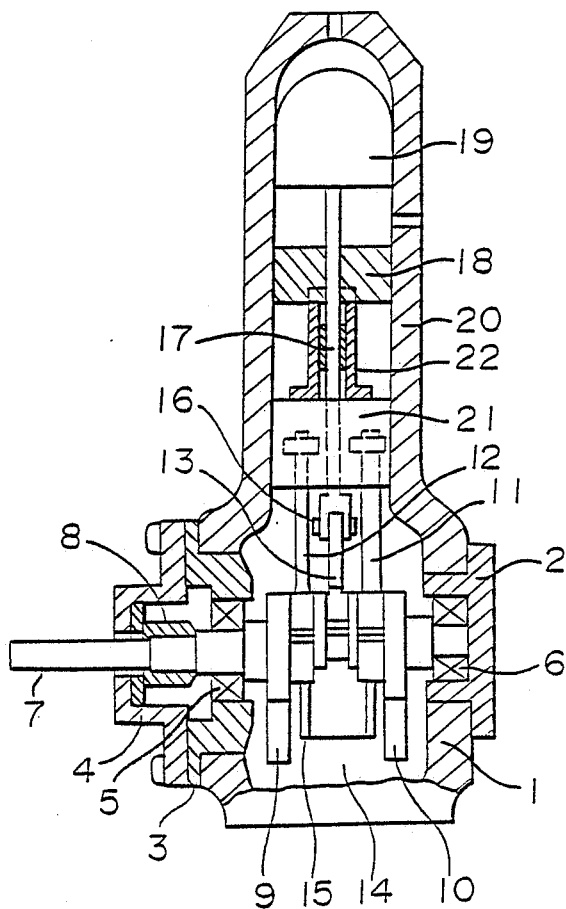
FIG. 7 is a longitudinal cross-sectional view of a conventional crank shaft type stirling engine.

Alternately, as shown in FIG. 5, a non-contact type displacement meter 32 is mounted on the casing 27 to detect the quantity of desplacement of the direct-acting driving part so that the unbalanced force of inertia of the direct-acting driving part is detected by estimation of the quantity of displacement, and by using the detected signal, the vibration-controlling actuator is driven. As the non-contact type displacement meter 32, an eddy current type displacement meter or an electro-static capacity type displacement meter is usable.

Thus, in accordance with the vibration-reducing apparatus for a stirling engine, there is provided the vibration-controlling actuator for producing a vibration-controlling force in respose to a signal provided from an outer device, a detector for detecting a force of inertia which causes an unbalancing movement in the direct-acting driving part, and a control circuit for controlling the vibration-controlling actuator so that the vibration-controlling force of the actuator canceles the unbalanced force of inertia of the direct-acting driving part on the basis of a signal detected by the detector. Accordingly, vibrations causes in the engine can be remarkably reduced, noises caused in the operation of the engine can be deadened to thereby to improve reliability of the stirling engine.

Obviously, numerous modifications and variation of the present invention are possible in light of the above teaching. It is therefore to be understood that within the scope of the appended claims, the invention may be practiced otherwise than as specifically described herein.

What is claimed is:

1. A vibration-reducing apparatus for a direct-acting type stirling engine wherein a change of pressure caused by reciprocating movements of a displacer is applied to a power piston to produce a mechanical force, and the mechanical force is converted into an electric power by a direct-acting type electric generator which is directly connected to said power piston so as to effect reciprocating movements with said power piston, which comprises:

a vibration-controlling actuator fixed to a cylinder to produce a vibration-controlling force in response to a drive-controlling signal given by the outside thereof;

a detector for detecting an unbalanced movement by a force of inertia in the reciprocating movements of a direct-driving part consisting of said power piston and said direct-acting type electric generator; and, a control circuit for receiving a detection signal from said detector to control said vibration-controlling actuator so that the vibration-controlling force of said vibration-controlling actuator cancels said unbalanced movement by the force of inertia caused by the reciprocating movements of said direct driving part.

2. The vibration-reducig apparatus according to claim 1, wherein said vibration-controlling actuator is constituted by a weight and a driving source for driving said weight.

3. The vibration-reducing apparatus according to claim 1, wherein said detector is a vibration sensor for detecting the acceleration of vibration of said direct driving part.

4. The vibration-reducing apparatus according to claim 1, wherein said detector is a load-weight converting device which directly detects the unbalanced movement by the force of inertia of said direct driving part by means of a spring.

5. The vibration-reducing apparatus according to claim 1, wherein said detector is a non-contact type displacement meter for detecting the quantity of displacement of said direct driving part.

* * * * *